United States Patent [19]
Erdman

[11] 3,866,117
[45] Feb. 11, 1975

[54] METHOD AND MEANS FOR MEASURING THE PHASE ANGLE BETWEEN CURRENT AND VOLTAGE

[75] Inventor: David M. Erdman, Fort Wayne, Ind.

[73] Assignee: General Electric Company, Fort Wayne, Ind.

[22] Filed: Sept. 25, 1973

[21] Appl. No.: 400,579

Related U.S. Application Data

[63] Continuation-in-part of Ser. No. 331,539, Feb. 12, 1973, abandoned.

[52] U.S. Cl. .................................. 324/54, 324/83 R
[51] Int. Cl. ...................... G01r 31/12, G01r 25/00
[58] Field of Search ........ 324/83 R, 83 A, 83 D, 54, 324/60 R

[56] References Cited
UNITED STATES PATENTS

| | | | |
|---|---|---|---|
| 2,170,813 | 8/1939 | Doble et al. ........................... | 324/54 |
| 3,230,449 | 1/1966 | Kaiser ................................. | 324/83 A |
| 3,349,324 | 10/1967 | Wakefield ........................... | 324/54 |
| 3,458,803 | 7/1969 | Maguire ............................. | 324/60 R |
| 3,710,242 | 1/1973 | Povey ................................. | 324/54 |

OTHER PUBLICATIONS

Paull–Elec. Engr., July 1971, Vol. 43, No. 521, pp. 52–55.

*Primary Examiner*—Alfred E. Smith
*Assistant Examiner*—Rolf Hille
*Attorney, Agent, or Firm*—Ralph E. Krisher, Jr.; Joe E. Barbee

[57] ABSTRACT

Methods and means for measuring the phase angle between current and voltage associated with an insulator are disclosed utilizing voltage and current transducing means and means for nulling parasitic capacitive and resistive current flow. Logic means responsive to the voltage and current transducing means provides an output pulse waveform having a pulse width dependent on the relative phase relationship between the voltage and current and this output pulse waveform may be filtered to provide a relatively constant output signal having a magnitude indicative of the insulation dissipation factor.

31 Claims, 15 Drawing Figures

METHOD AND MEANS FOR MEASURING THE PHASE ANGLE BETWEEN CURRENT AND VOLTAGE

This is a continuation-in-part of Ser. No. 331,539 filed Feb. 12, 1973, now abandoned.

BACKGROUND OF THE INVENTION

This invention relates to methods and means for measuring the phase angle between current and voltage associated with insulators.

Dissipation factor is a well-known measure of dielectric properties such as dielectric constant, thickness, and integrity of bodies of insulation. Typically, this factor is determined by measuring capacitive current through the insulation upon application thereacross of an alternating potential difference of known magnitude. The term "capacitive current through" is used to indicate the resultant or effective current flow in the circuit and is the vector sum of the resistive and capacitive current components. This measurement is commonly done by the balancing of bridge circuits. Once the capacitive current and voltage across the insulator is measured the dissipation factor becomes readily calculatable through measure of the phase angle between the current and voltage.

While the above procedure is both accurate and practical for laboratory tests it has proven to be an inefficient means of controlling quality in many manufacturing situations. This is principally due to the necessity of having to balance a circuit each time a new sample is presented for testing prior to measuring phase angle. Where continuous measurement is required, as of elongated wire insulation passing a test station, it is quite inefficient to have to stop the wire periodically and measure the capacitance and resistance of a selected portion of insulation. In addition, in some applications, as frequently is the case with wire, one of the test electrodes, namely the wire itself, is grounded. The balancing of a test bridge circuit to measure the capacitance and resistance will thus include the parasitic capacitance and resistance of the test instrumentation itself to ground leading to an erroneous measure of dissipation factor.

Accordingly, it is an object of the present invention to provide improved methods and means for measuring the phase angle between capacitive current and voltage across a grounded insulator.

Another object of the invention is to provide improved methods and means for measuring the phase angle between capacitive current and voltage across selected portions of grounded wire insulation.

SUMMARY OF THE INVENTION

In one form of the invention means are provided for measuring the phase angle between capacitive current and voltage across a grounded surface and an ungrounded surface of an insulator. The measuring means comprises means for coupling the insulator to a source of alternating current to apply alternating voltage across the insulator grounded and ungrounded surfaces, and means for nulling parasitic capacitance and resistance of the coupling means. Voltage transducing means are provided which are connectable across the insulator grounded and ungrounded surfaces for sensing the voltage applied across the insulator to ground and for generating a first signal indicative of voltage across the insulator. Means for nulling parasitic capacitive and resistive current within the voltage transducing means are also provided. Current transducing means are connected to series circuit with the coupling means for sensing the capacitive current through the insulator generated by the alternating voltage applied across the insulator to ground, and for generating a second signal indicative of capacitive current through the insulator. Means for measuring the phase angle between the first and second signals is also provided comprising means for converting the first and second signals to first and second generally rectangular waveforms having the same respective frequencies and, at least in absolute value, the same relative phase relationship, logic means responsive to the rectangular waveforms for providing an output pulse waveform having a pluse width dependent on the relative phase relationship between the first and second generally rectangular waveforms, and means responsive to the output pulse waveform for providing a relatively constant output signal the magnitude of which is indicative of the phase angle between the first and second signals and therefore also indicative of the insulator dissipation factor.

In another form of the invention a method is provided for measuring the phase angle between capacitive current and voltage across a grounded surface and an ungrounded surface of an insulator. The insulation grounded and ungrounded surfaces are coupled with coupling means to a source of alternating current to apply alternating voltage across the insulator grounded and ungrounded surfaces. Parasitic capacitance of the coupling means is nulled. A first signal indicative of voltage across the insulator is generated with voltage transducing means. Parasitic capacitive current within the voltage transducing means is also nulled. A second signal indicative of capacitive current through the insulator is generated. The phase angle between the first and second signals is then measured.

DETAILED DESCRIPTION OF THE DRAWING

Figure 1:
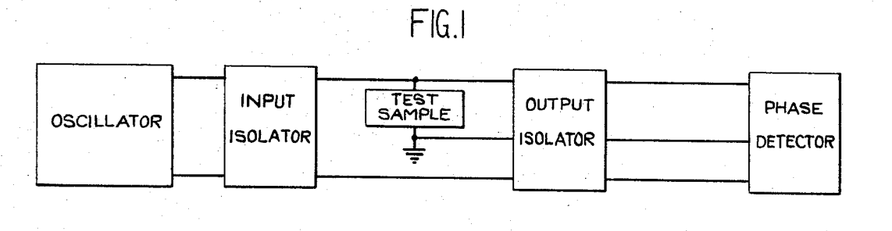
FIG. 1 is a block diagram illustrating a sample of insulation being tested with methods and means incorporating principles of the present invention.
Figure 4:
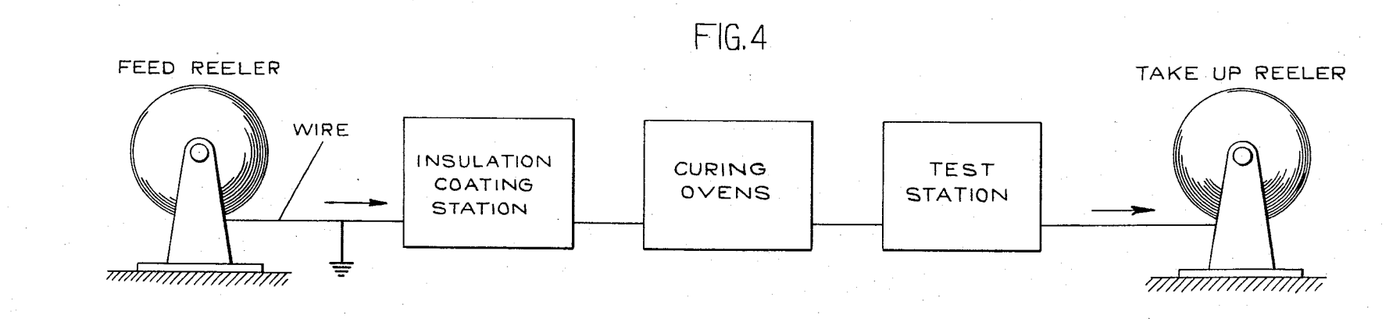
FIG. 4 is a block diagram illustrating a series of manufacturing steps in coating a wire with insulation and testing of insulated wire with the means illustrated in FIG. 1.
Figures 5, 9:
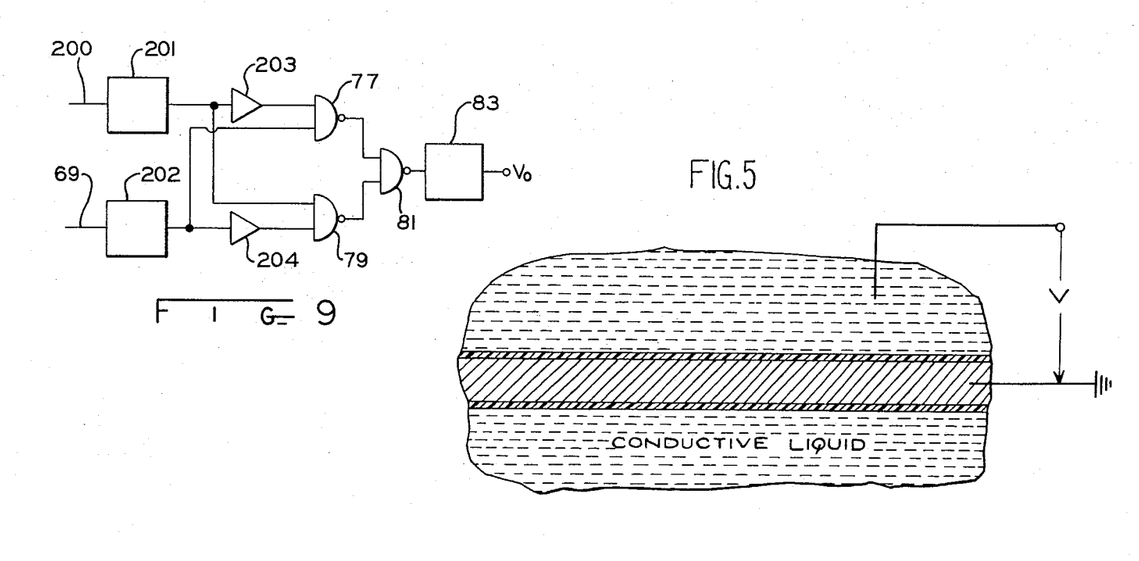
FIG. 5 is a schematic view of a fragment of a wire undergoing testing in the test station shown in FIG. 4.
FIG. 9 is a simplified block diagrammatic presentation of a phase detector embodying the invention in another form.

Referring now in more detail to the drawing there is shown in FIG. 1 a sample of insulation being tested with methods and means incorporating principles of the present invention in one form. The test sample may be any body of dielectric material in contact with a grounded electrical conductor. It may, for example, be a coating of insulation on wire electrically coupled to ground (a point of reference potential) through a reeler as shown in FIGS. 4 and 5. In this case measurement may be made continuously as the wire is passed through the test station following a wire manufacturing step in which insulation is applied about the conductive wire. Here in FIGS. 4 and 5, the grounded conductive wire itself serves as one electrode and a conductive liquid in which the test portion of the wire is submerged as the other electrode. Alternatively, a conductive roller or sets or rollers or the like could be substituted for the conductive liquid as an electrode. In the case of individual strips of insulated wire or other forms of conductive material, the outer electrode may be grounded rather than the inner conductor. This is particularly useful where conductive liquid bath electrodes are employed since this negates need to insulate the grounded conductive liquid. In any event it is preferable to have both electrodes in intimate contact with the dielectric body to be tested.

As previously stated, measurement of the phase angle between capacitive current and voltage applied across insulation renders an indication of the dielectric constant, thickness and integrity thereof. For example, from phase angle the dissipation factor may be readily determined. This information may, for example, be used in judging the cure of an insulative enamel such as an esterimide which has just been coated onto wire. There are, of course, many other situations where determination of phase angle between capacitive current and voltage across an insulator having a surface in contact with a grounded conductor is desired.

With reference again to FIG. 1 it is seen, in light of the above, that one electrode in intimate contact with one surface of the test sample of insulation is grounded or equivalently connected to a point of reference potential whereas the another electrode in intimate contact with another surface of the sample is coupled to an input and to an output isolator. The input isolator is in turn coupled to an oscillator and the output isolator to a phase detector. In the preferred embodiment of FIGS. 1 through 3 a conventional oscillator and phase detector may be used. The oscillator may, of course, be replaced with another source of electric current for other applications. The input isolator essentially serves to null parasitic capacitance of the means coupling the test sample to the oscillator. The output isolator includes voltage and current transducing means for generating two signals to be fed to the phase detector indicative of capacitive current and voltage respectively across the sample. This isolator also includes means for nulling parasitic capacitive current in the voltage transducing means. As a result of this nulling the shift in phase detectable by the phase detector is attributable essentially just to the characteristics of the test sample and not to the means employed in applying test voltage to the sample and in generating and transmitting independent signals therefrom to the detector. It is thus apparent that the output isolator, in effect, partially functions as an electronic voltmeter or voltage transducer, and also as an electronic ammeter or current transducer.

Figure 2:
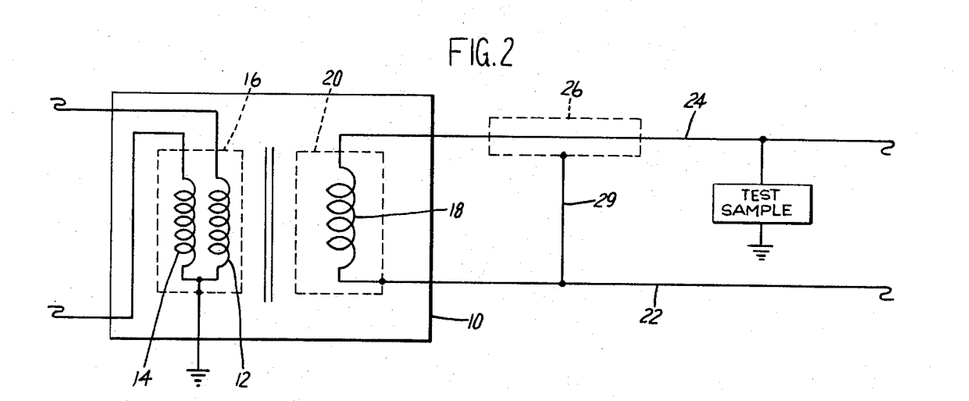
FIG. 2 is a schematic diagram of the input isolator element of FIG. 1.
Figure 3:
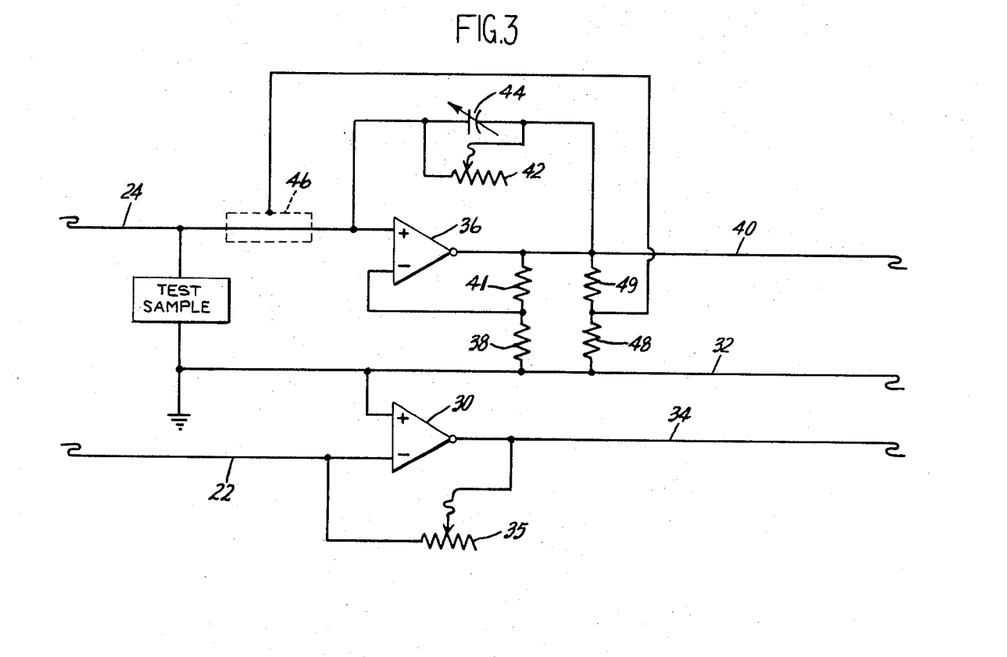
FIG. 3 is a schematic diagram of the output isolator element of FIG. 1.

In general FIG. 2 illustrates in detail a schematic diagram of the input isolator and FIG. 3 illustrates in detail a schematic diagram of the output isolator. However, there is some overlapping of functions between the two isolators. For clarity however they are treated as two distinctive components. Furthermore, though FIG. 1 is descriptive of means and methods embodying the invention in only the most general terms this block diagram does serve to orient the reader who should note particularly that there are three inputs to the phase detector, as is conventional, whereas there are only two to the test sample.

Referring now to the details of FIG. 2, the input isolator is seen to comprise a transformer 10 having a primary winding 12 adapted to be connected to the output of the oscillator. An auxiliary winding 14 is used to provide a feedback signal that is applied to the input of the output amplifier of the oscillator. The use of feedback will, as will be understood, minimize distortion that otherwise might be caused by the transformer. The primary and auxiliary windings, which are each insulated, are twisted about one another and electrically connected to each other at one end. The connected winding ends are also connected to a cylindrical primary winding shield 16 in which the primary and auxiliary windings reside. Shield 16 is adapted for connection to ground. Transformer 10 further comprises a secondary insulated winding 18 which resides between two electrically connected cylindrical secondary winding shields 20 fitted about primary winding shield 16. One end of the secondary winding is connected to the secondary winding shields. The primary and secondary windings are magnetically coupled by means of a conventional iron core.

One end of secondary winding 18 is adapted to be connected to an ungrounded electrode in intimate contact with the test sample of insulation by means of line 24 which line passes through line shield 26. The other end of winding 18, which is connected to secondary winding shields 20, is also connected to the inverting terminal of operational amplifier 30 by means of line 22. Line 22 is also connected to line shield 26 by connector 29.

With reference now to FIG. 3 the noninverting terminal of operational amplifier 30 is seen to be connected to ground by ground line 32 which is adapted to be connected to an input terminal of a phase detector as shown in FIG. 1. The output terminal is also adapted to be connected to the phase detector by means of line 34. A potentiometer 35 is connected across the inverting and output terminals of amplifier 30 for amplifier gain adjustment.

In addition to being connected to the ungrounded electrode overlaying the test sample, line 24 is also connected to the noninverting terminal of operational amplifier 36. The inverting amplifier terminal is connected to ground line 32 through resistor 38. The amplifier output terminal is connectable to the phase detector by means of line 40 and to the inverting terminal through resistor 41. A potentiometer 42 and variable capacitor 44 are connected in parallel across the noninverting and output terminals of amplifier 36. Finally, a line shield 46 disposed about a portion of line 24 coupling amplifier 36 with the non-grounded test sample electrode is connected by means of a guard circuit to ground line 32 through a resistor 48 and to line 40 through resistor 49.

For operation all lines are connected as previously described and the oscillator energized. Alternating voltage is accordingly coupled across the test sample through transformer 10. Parasitic or stray capacitance of the primary winding to ground is prevented or nulled by the presence of grounded shield 16 which is electrically connected to one end of the windings. Parasitic capacitance of transformer secondary winding 18 is also nulled by means of shield 20 which is electrically connected to one end of the winding and also to ground through amplifier 30. Grounded line shield 26 further serves to null most of the parasitic capacitance of line 24 between the transformer itself and the test sample. In this manner voltage applied across the test sample is essentially isolated from the influence of parasitic capacitance of the means employed in coupling the sample to the oscillator.

The circuitry of FIG. 3 serves to generate two distinct signals indicative of capacitive current and voltage respectively across the test sample, and to feed the two signals to a phase detector without itself introducing parasitic capacitive and resistive current. In accomplishing this, operational amplifier 36 serves to provide a signal across lines 32 and 40 indicative of voltage across the test sample while operational amplifier 30 provides a signal across lines 32 and 34 indicative of capacitive current through the sample. Parasitic capacitive and resistive current of the voltage transducing means provided by amplifier 36 is nulled by initial adjustment of variable capacitor 44 and potentiometer 42, respectively to feed back nulling capacitive and resistive current drawn by the amplifier itself. This may be done by momentarily disconnecting the test sample from the circuit and adjusting variable capacitor 44 and potentiometer 42 until the output of amplifier 30 as measured across lines 32 and 34 is zero thereby indicating the absence of capacitive and resistive current within the test circuit. Parasitic capacitance in line 24 between the test sample and amplifier 36 is nulled by means of shield 46 coupled to ground through resistor 48 which circuit inhibits voltage from developing between the shield and the shielded line and thus inhibits capacitive current therebetween. As a result of these transducing and nulling operations the phase angle detectable by the phase detector between detector input signals is almost exclusively attributable to dielectric characteristics of the sample.

One set of values for the elements schematically diagrammed in FIGS. 2 and 3 is listed in Table 1. It should, of course, be understood that innumerable other sets of values for the components may be used in practicing the invention.

TABLE 1

| ELEMENT | CHARACTERISTICS |
| --- | --- |
| Operational Amplifier 30 | Analog Devices, Inc. No. 45K. Installed as variable gain current to voltage converter. |
| Operational Amplifier 36 | Analog Devices, Inc. No. 40J. Installed as 1.5 gain non-inverting voltage amplifier. |
| Transformer 10 | 1:1 output to input voltage. 140 turns each winding. |
| Resistor 41 | 10K ohms |
| Resistor 38 | 22K ohms |
| Resistor 49 | 10K ohms |

TABLE 1-Continued

| ELEMENT | CHARACTERISTICS |
| --- | --- |
| Resistor 48 | 22K ohms |
| Oscillator | 4 volts at 1,000 hertz output. |

Figure 6:
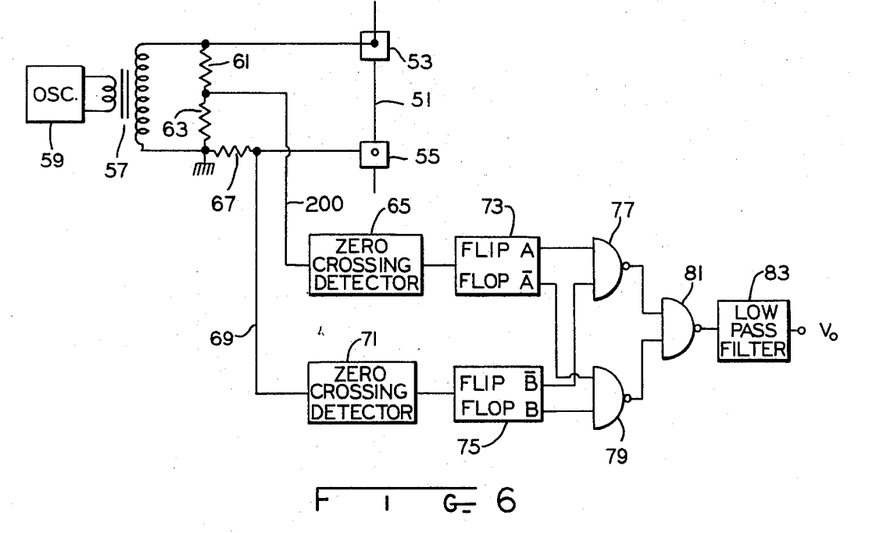
FIG. 6 is a simplified block diagrammatic illustration of a phase detector in accordance with the present invention.

Turning now to FIG. 6 which illustrates in simplified form a functional block diagram illustrating phase detector circuitry but eliminating, for the sake of simplicity, the input and output isolators described in connection with FIGS. 1 through 3, a sample of insulated conductor 51 is illustrated as having a first connection to the conductor at point 53 and a second connection to, for example, a conductive liquid surrounding the insulator at 55, across which the voltage from the secondary of transformer 57 is applied. This transformer 57 receives an input signal from the oscillator 59 and may, as will appear more clearly in the discussion of FIGS. 8a and 8b, have provision for signals of differing frequencies. The voltage applied across the insulating surfaces is also applied across the series connected resistors 61 and 63 which function as a voltage divider circuit to apply a known fraction of the test voltage to the zero crossing detector 65. The current induced through the insulation of the test specimen 51 must of course flow through resistor 67 and thus the potential on line 69 relative to ground is indicative of the induced current flow through the insulator. Zero crossing detector 71 thus receives a signal indicative of the induced current flow through the insulator while the zero crossing detector 65 receives a signal indicative of the voltage across that insulator.

This voltage and current will, in general, be out of phase and the phase angle beetweem them is used to indicate the quality of insulation of a test specimen. For a given test specimen, including a given type of insulation, a given temperature of insulation, and a given frequency applied to transformer 57; insulation having preferred dielectric properties will be indicated when the just-mentioned phase angle is within a predetermined range. This range is determinable by testing samples or specimens of known acceptable quality and then noting the phase angle associated with the test of each such sample. The range of phase angles so noted then may be used, when testing other specimens. A phase angle associated with testing any other similar specimen that is greater or less than (i.e., outside of) the predetermined range will indicate that such similar specimen has inferior dielectric properties. This in turn, is indicative of less than satisfactory mechanical or other electrical properties.

Figure 7A:
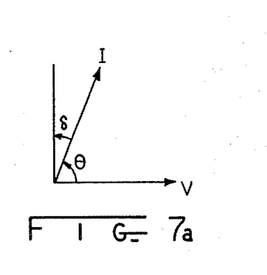
FIGS. 7a through 7f illustrate various current-voltage relationships and waveforms associated with the block digram of FIG. 6.
Figure 7B:
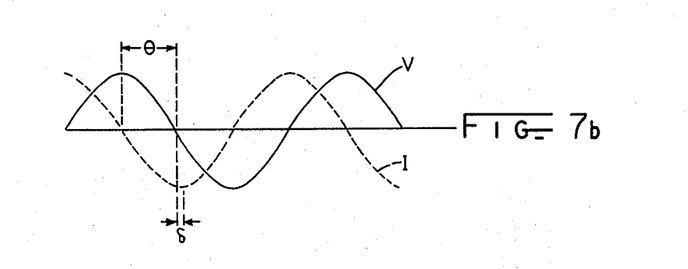

The phase difference or phase angle between this voltage and current is depicted in vector diagram form in FIG. 7a and as a time base sinusoidal depiction in FIG. 7b. In FIGS. 7a and 7b, $\theta$ represents the well-known power factor angle between the voltage and current and, of course, if the insulator sample functions as a perfect dielectric this angle will be 90°. Leakage will, of course, introduce a resistive component of current and in normal practice the phase angle $\theta$ will be somewhat less than 90° as illustrated.

This dissipation factor (DF) is defined as:

$$DF = \text{conductivity}/w \text{ permittivity} = \tan \delta$$

where $w$ is $2\pi$ times the frequency of the applied voltage. For small angle $\delta$ this dissipation factor is approximately the same as the power factor (cos $\theta$) and hence may be approximated by the numerical difference between $\pi/2$ and the numerical value of the angle $\theta$ in radians.

Figure 7C:
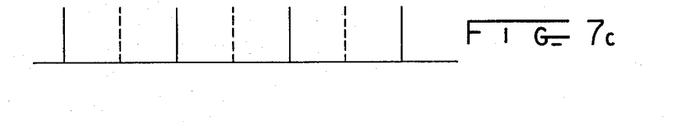
Figure 7D:
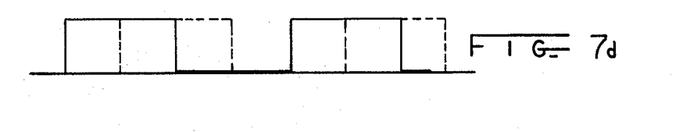
Figure 7E:
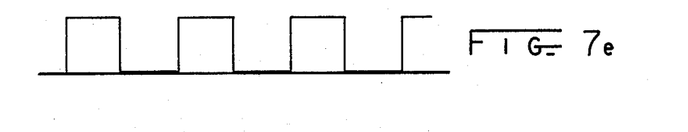

Considering then FIGS. 7b through 7e in conjunction with FIG. 6, the zero crossing detector 65 receives as its input the sinusoidal waveform V while zero crossing detector 71 receives as its input the waveform labeled I. The zero crossing detectors provide very narrow output pulse spikes when their inputs cross zero and the solid spikes of FIG. 7c represent the output signals from zero crossing detector 65 while the dotted spikes of FIG. 7c illustrate the output of zero crossing detector 71. These spikes are employed to change the states of flip-flops 73 and 75 with the solid line waveform of FIG. 7d illustrating the A output of flip-flop 73 and the dotted line of FIG. 7d illustrating the B output of flip-flop 75. The A and B outputs of these flip-flops are supplied to NAND gate 77 while the B and A outputs of these flip-flops are supplied to NAND gate 79. The outputs of the two NAND gates are in turn supplied to a further NAND gate 81 having the output depicted in FIG. 7e are represented by:

$$\overline{(A \wedge \overline{B})} \wedge \overline{(B \wedge \overline{A})} = (A \wedge \overline{B}) V (B \wedge \overline{A})$$

the right hand expression of which is readily visible in comparing FIGS. 7d and 7e. Low pass filter 83 provides an average value for the waveform of FIG. 7e and thus the output voltage $V_o$ represents this average value. It should be noted that the initial states of the flip-flops 73 and 75 should be controlled in some manner since if one of those flip-flops had been in the state opposite that assumed for the depictions in FIGS. 7d and 7e then the resultant FIG. 7e would have had a high level or "one" in those regions illustrated as "zero" and a low level or "zero" in those regions illustrated as "one" and variations in phase angle $\theta$ would cause opposite variations in the output voltage $V_o$.

Figure 7F:
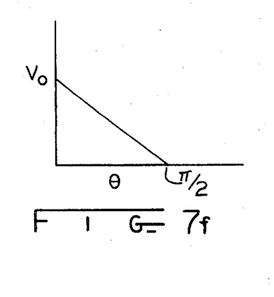

As depicted, a decrease in the angle $\theta$ will be seen to move the solid and dotted pulse waveforms of FIG. 7d apart so that they coincide for a lesser portion of the cycle thus resulting in greater width pulses in FIG. 7e and a higher output voltage $V_o$. If the two original waveforms happen to be 90° apart as would be the case for a perfect capacitor between the test points 53 and 55, the output of NAND gate 81 will be zero and one for equal time intervals. If the phase angle $\theta$ would happen to be zero (an extremely poor quality insulation) NAND gate 81 will always provide a "one" output signal and a maximum voltage $V_o$ will be derived. As will appear in the discussion of the more complete circuitry of FIGS. 8a and 8b it is desirable to introduce a level shift in the waveform of FIG. 7e so that the $V_o$ output as a function of $\theta$ appears as illustrated in FIG. 7f with zero output occuring for a 90° phase angle between the voltage and current.

Rather than using a circuit as exactly shown in FIG. 6, a somewhat simplified approach as shown in FIG. 9 may be followed. With the FIG. 9 approach a signal indicative of test specimen voltage is supplied by circuit means 200 to a zero crossing comparator 201; and a signal indicative of test specimen current is supplied by circuit means 69 to zero crossing comparator 202. The comparators 201 and 202 then convert the signals applied thereto to first and second repetitive waveforms that are generally rectangular (or square) waveforms having the same respective frequencies and the same relative phase relationship. It will be understood, of course, that repetitive waveforms of other shapes may be used when the FIG. 6 or FIG. 9 approach is followed. However, rectangular waveforms result in a linear relationship between phase angle and output voltage $V_o$ so that direct meter readings may be taken. These generally rectangular waveforms would be generally as depicted in FIG. 7d.

The outputs of comparators 201, 202 are applied, respectively, to logic inverters 203, 204; the output signals of which would correspond to the output signals of flip-flops 73, 75 of FIG. 6. The NAND gates 77, 79, 81, and low pass filter 83 are the same in both FIGS. 6 and 9.

In both FIGS. 6 and 9, the logic means comprising gates 77, 79 and 81 form a coincidence detecting means that have a first output condition when two similar input signals are applied thereto; and a second output condition when two different input signals are applied thereto.

Figure 8A:
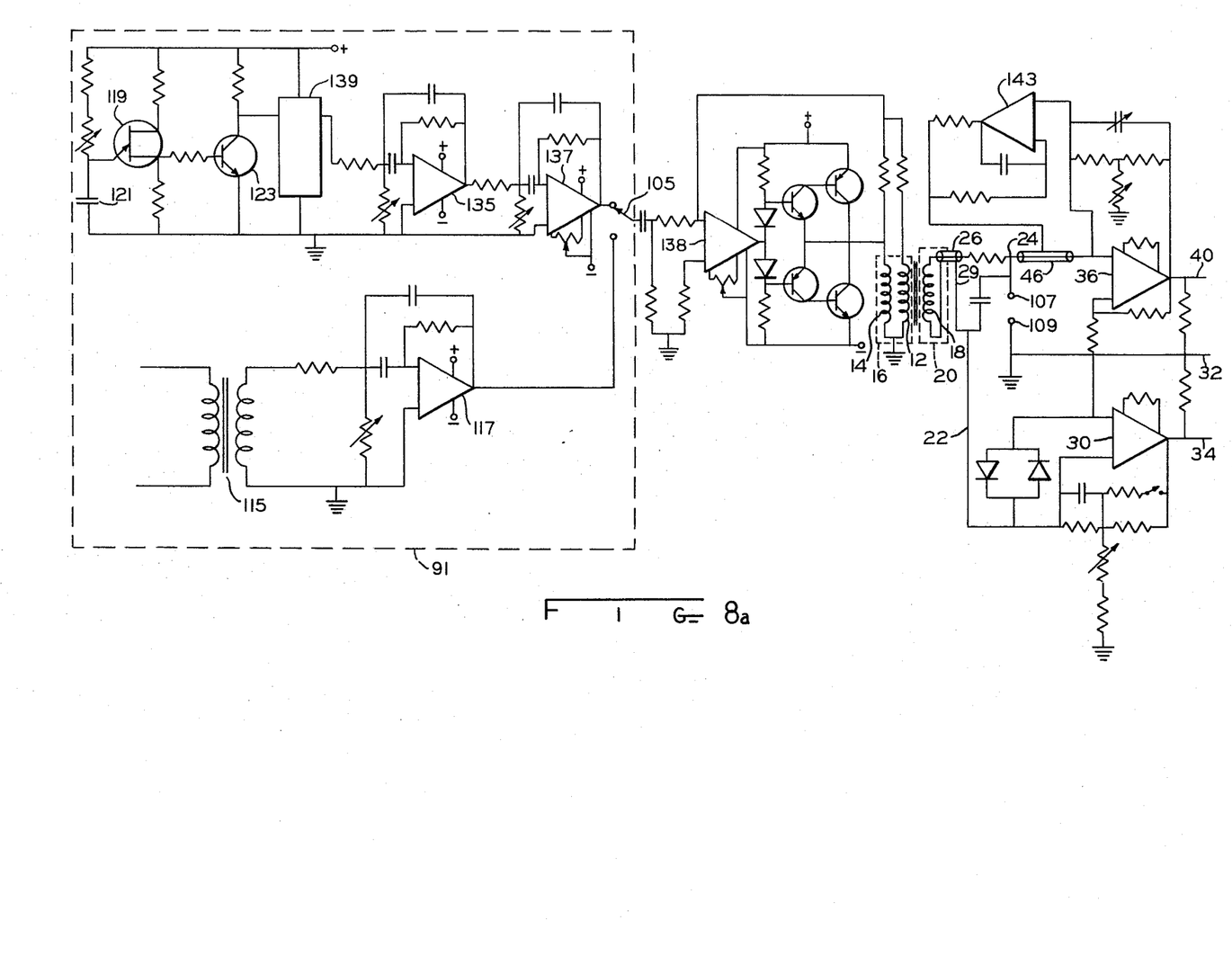
FIGS. 8a and 8b when joined (--with FIG. 8a to the left of FIG. 8b--) form a detailed schematic diagram of one form of the present invention.
Figure 8B:
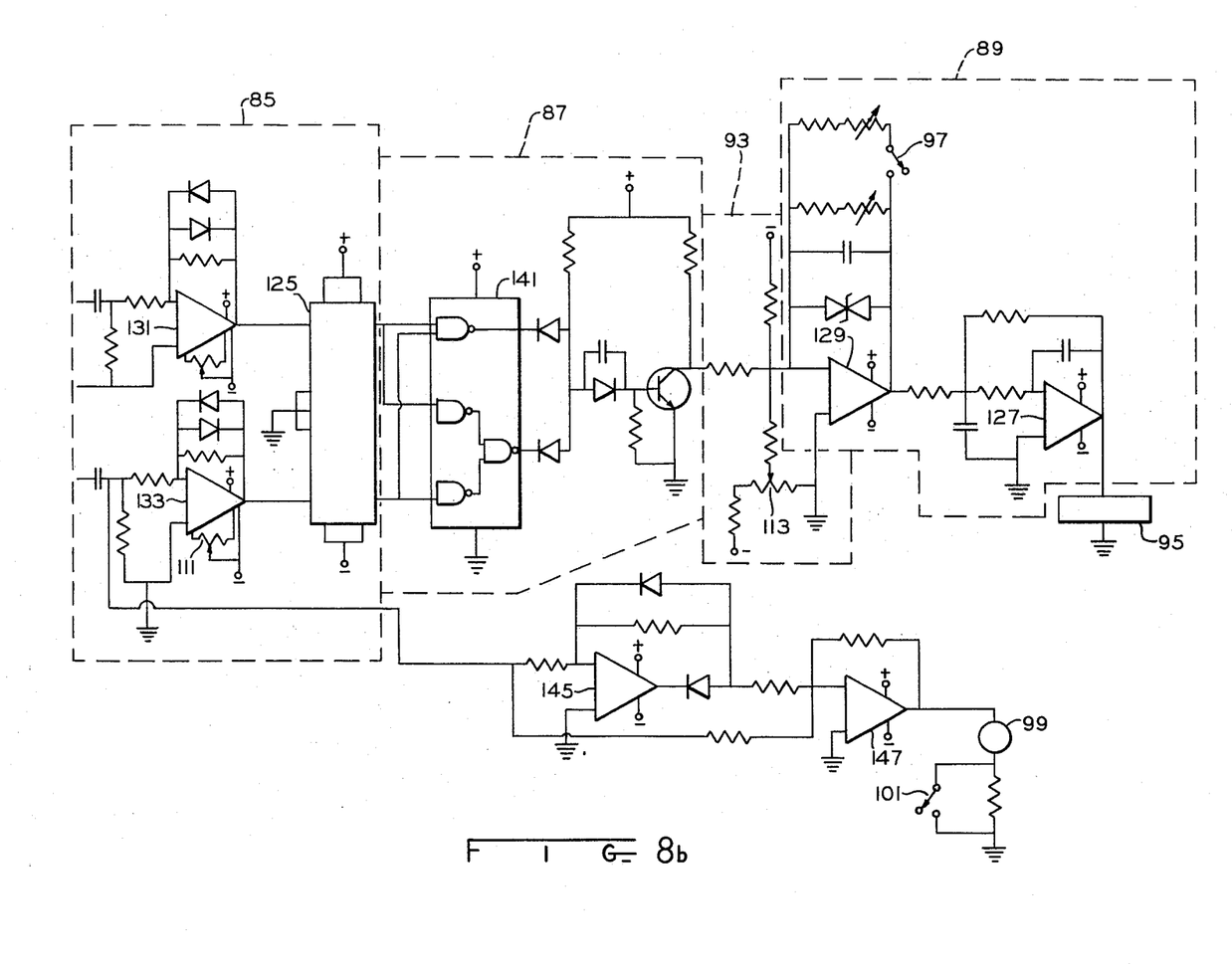

FIGS. 8a and 8b when joined illustrate a rather complete schematic diagram of the preferred embodiment of the present invention represented by FIG. 9. Most of the functions and components shown in FIGS. 8a and 8b will be familiar from the preceding discussion with corresponding reference numerals from FIGS. 2 and 3 having been carried over to comparable elements in FIGS. 8a and 8b. In general the circuitry enclosed within the dotted line 85 functions as a zero crossing comparator circuit; that within the dotted line 87 functions as a coincidence detector circuit; that within dotted line 89 functions as a filter and scaling circuit; that within dotted line 91 functions as a test signal source capable of providing more than one test signal frequency; and that within dotted line 93 functions as a voltage level shifting circuit mentioned as desirable but not illustrated in conjunction with the discussion of FIG. 6.

The system depicted in FIGS. 8a and 8b may be incorporated in a small portable unit having on the front panel thereof the DF meter 95 and a scale selection switch 97 which in the position shown might be an insensitive zero to 100 percent dissipation factor scale whereas in the position not illustrated a more sensitive zero to 10 percent dissipation factor reading might be obtained on the meter 95. The front panel would also typically display a current overload meter 99 again having selectable scales in accordance with a front panel switch 101 illustrated in its low gain position. This low gain or more sensitive position is generally used for sixty cycle operation as determined by panel selector switch 105 while when that switch is in the 1,000 cycle per second position, the switch 101 would normally be moved from the position shown to its high gain position thereby making the meter 99 more sensitive.

In operation a known dissipation factor sample may be placed between the sample terminals 107 and 109 and the sensitivity control 111 adjusted to provide a preferred current level indication on the meter 99. The square wave level is then appropriately shifted by varying the potentiometer 113 to give a proper reading for the known sample on the DF meter 95.

As noted earlier, it is desirable to have multiple frequency capabilities in equipment of this type and in FIG. 8a the test signal source 91 includes a step down transformer 115 responsive to standard sixty cycle line voltage for providing by way of the operational amplifier 117 a controlled sixty cycle signal to one of the terminals of the selector switch 105. This signal source 91 may also include a higher frequency source coupled to another terminal of the switch 105 and, as illustrated in FIG. 8a, includes a unijunction transistor 119 coupled to oscillate at for example 1,000 cycles per second as determined by the rate of charging of the capacitor 121. The oscillator output is coupled by way of transistor 123 and several further stages of amplification to provide an accurate 1,000 cycle per second test signal at a contact of switch 105. The particular test signal selected is then coupled by way of further amplification stages to the now familiar input isolator circuitry of FIGS. 1 and 2. As before, a pair of phase displaced sinusoidal waveforms are provided, one from operational amplifier 36 indicative of the voltage applied to the sample and the other from operational amplifier 30 indicative of the current flow through the sample. A dual comparator integrated circuit 125 converts these sine waves to respective recurring pulse waveforms much like those illustrated in FIG. 7d, however, in the particular embodiment of FIG. 8b these pulses correspond to the positive half waves of their respective sinusoidal waveforms and the start and end of each pulse corresponds to the zero crossing point. The coincidence detector 87 thereafter provides a single recurring pusle waveform much like that illustrated in FIG. 7e wherein each pulse represents a time interval in which the outputs of the dual comparator 125 are simultaneously either both positive or both zero. The level shifting circuitry 93 then shifts the zero reference point relative to this recurring pulse waveform which is thereafter filtered and fed to the meter 95 to provide the dissipation factor indication.

Typical elements employable in the embodiment of FIGS. 8a and 8b include a type MC 1741 operational amplifier available from Motorola, Inc., for the operational amplifiers 117, 127, 129, 131, 133, 135 138 and 137. Integrated circuit 125 may be a type MC 1414L while integrated circuit 141 containing the depicted NAND gates may be an MC 7,400 and integrated circuit 139 a type MC 663 all available from Motorola, Inc. Operational amplifiers 143 and 36 may be type 40 J available from Analog Devices, Inc. (of Norwood, Massachusetts) while the current sensing amplifier 30 is a type 40 K also available from Analog Devices, Inc. (of Norwood, Massachusetts). Type CA 3747 operational amplifiers may be employed at 145 and 147 to drive the current overload meter 99 and are available from R C A (Radio Corporation of America). It should, of course, be understood that innumerable other components may be used in implementing the embodiment of FIGS. 8a and 8b. In addition, many variations may be made to the specific methods and means set forth in the present specification without departing from the spirit and scope of the invention as set forth in the concluding claims.

What I claim as new and desire to secure by Letters Patent of the United States is:

1. Apparatus for measuring the phase angle between voltage and capacitive current across a grounded surface and an ungrounded surface of an insulator, comprising:

a. means for coupling the insulator to a source of alternating current to apply alternating voltage across the insulator grounded and ungrounded surfaces;

b. means for preventing parasitic capacitance and resistance of said coupling means;

c. solid state voltage transducing means connectable across the insulator grounded and ungrounded surfaces for sensing the voltage applied across the insulator to ground and for generating a first signal indicative of voltage across the insulator;

d. means for nulling parasitic capacitive and resistive current within said solid state voltage transducing means;

e. current transducing means connected in series circuit with said coupling means for sensing the capacitive current through the insulator generated by the alternating voltage applied across the insulator to ground and for generating a second signal indicative of capacitive current through the insulator; and f. means for measuring the phase angle between said first and second signals.

2. The apparatus of claim 1 wherein said coupling means comprises a transformer having a primary winding adapted to be coupled to said alternating current source, and wherein said means for preventing parasitic capacitance and resistance of said coupling means comprises a primary winding shield disposed about said primary winding and connected to one end of said primary winding and to ground and wherein a feedback winding is disposed within the primary winding shield adjacent the primary winding.

3. The apparatus of claim 1 wherein said coupling means comprises a transformer having a secondary winding having one end adapted to be connected to said insulator ungrounded surface and another end adapted to the connected to ground through said current transducing means, and wherein said means for preventing parasitic capacitance and resistance of said coupling means comprises a secondary winding shield disposed about said secondary winding and connected to said other end of said secondary winding.

4. The apparatus of claim 3 wherein said one end of said secondary winding is adapted to be connected to said insulation ungrounded surface through a line shield and wherein said line shield is connected to said secondary winding shield.

5. The apparatus of claim 1 wherein said voltage transducing means comprises an operational amplifier having an inverting input terminal, a noninverting input terminal, and an output terminal; and wherein said inverting input terminal is adapted for connection to ground through a resistor and said noninverting input terminal is adapted to be connected to said insulation ungrounded surface.

6. The apparatus of claim 1 wherein said means for nulling parasitic capacitive and resistive current within said solid state voltage transducing means comprises a variable capacitor connected across an operational amplifier noninverting input terminal and output terminal and a variable resistor connected across said operational amplifier noninverting input terminal and output terminal.

7. The apparatus of claim 5 wherein said solid state voltage transducing means is connectable to the insulation ungrounded surface through a conductor connected to said operational amplifier noninverting terminal; and wherein said means for nulling parasitic capacitive and resistive current within said voltage transducing means comprises a shield disposed about and insulated from said conductor and resistive connection means connecting said shield with said operational amplifier output terminal.

8. The apparatus of claim 1 wherein said current transducing means comprises an operational amplifier having a noninverting input terminal, an inverting input terminal, and an output terminal; and wherein said inverting input terminal is connected to said coupling means and said non-inverting input terminal is connectable to ground.

9. The apparatus of claim 8 wherein said coupling means comprises a transformer having a secondary winding disposed within a secondary winding shield with one winding end connected to said secondary winding shield, and wherein said operational amplifier inverting input terminal of said current transducing means is connected to said secondary winding shield.

10. Apparatus for measuring the phase angle between capacitive current and voltage across an insulator having a grounded surface and an ungrounded surface, comprising:
   a. a transformer having a secondary winding;
   b. means for coupling said transformer secondary winding across said insulator grounded and ungrounded surfaces;
   c. means for preventing parasitic capacitance of said coupling means and of said transformer secondary winding;
   d. solid state means for generating a first signal indicative of voltage across said insulator grounded and ungrounded surfaces;
   e. means for nulling parasitic capacitive current through said first signal generating means;
   f. means for generating a second signal indicative of capacitive current between said insulator grounded and ungrounded surfaces; and
   g. solid state means for measuring the phase angle between said first and second signals.

11. The apparatus of claim 10 wherein said means for preventing parasitic capacitance of said coupling means and of said transformer secondary winding comprises a secondary winding shield disposed about and connected to said secondary winding.

12. The apparatus of claim 10 wherein said coupling means comprises a conductor connected to one end of said transformer secondary winding and adapted to be connected to said insulator ungrounded shield, and wherein said means for nulling parasitic capacitance of said coupling means and of said transformer secondary winding comprises a line shield disposed about and insulated from said conductor and means connecting said line shield to another end of said transformer secondary winding.

13. The apparatus of claim 10 wherein said solid state means for generating a first signal indicative of voltage across said insulator grounded and ungrounded surfaces comprises an operational amplifier having an inverting input terminal, a noninverting input terminal, and an output terminal; and wherein said inverting input terminal is adapted for connection to ground through a resistor and said noninverting input terminal is adapted to be connected to said insulation ungrounded surface.

14. The apparatus of claim 13 wherein said means for preventing parasitic capacitive current through said first signal generating means comprises a variable capacitor connected across said operational amplifier noninverting input terminal and output terminal. a 15. The apparatus of claim 13 wherein said means for preventing parasitic capacitive current through said first signal generating means comprises a shield disposed about and insulated from a conductor connected to said noninverting input terminal of said operational amplifier.

16. The apparatus of claim 10 wherein said current transducing means comprises an operational amplifier having a noninverting input terminal, an inverting input terminal, and an output terminal; and wherein said inverting input terminal is connected to said coupling means and said non-inverting input terminal is connectable to ground.

17. Apparatus for generating a signal indicative of voltage and a signal indicative of capacitance current across a grounded surface and an ungrounded surface of an insulator comprising:
   a. isolating means for coupling the insulator to a source of alternating current to apply alternating voltage across the insulator grounded and ungrounded surfaces;
   b. means for preventing parasitic capacitance in said coupling means;
   c. solid state voltage transducing means connectable across the insulator grounded and ungrounded surfaces for sensing the voltage applied across the insulator to ground and for generating a first signal indicative of sensed voltage across the insulator;
   d. means for nulling parasitic capacitive current through said solid state voltage transducing means;
   e. solid state current transducing means connected in series circuit with said coupling means for sensing the capacitive current through the insulator generated by the alternating voltage applied across the insulator to ground and for generating a second signal indicative of sensed capacitive current through the insulator; and
   f. means for determining the phase angle between the first and second signal and producing a signal proportional to the phase angle.

18. A method of meausring the phase angle between capacitive current and voltage across a grounded surface and an ungrounded surface of an insulator, said method comprising the steps of:
   a. coupling the insulation grounded and ungrounded surfaces with coupling means to a source of alternating current to apply alternating voltage across the insulator grounded and ungrounded surfaces;
   b. preventing parasitic capacitance of said coupling means;
   c. generating a first signal indicative of voltage across the insulator with solid state voltage transducing means;
   d. nulling parasitic capacitive current through said solid state voltage transducing means;
   e. generating a second signal indicative of capacitive current across the insulator; and
   f. measuring the phase angle between the first and second signals.

19. The method of claim 18 wherein parasitic resistance of said coupling means and of solid state voltage transducing means is nulled.

20. Apparatus for measuring the dissipation factor of an insulator in intimate contact with a first conductor comprising:

a second conductor adapted to be placed in intimate contact with an insulator surface spaced from the first conductor;

means for coupling the first and second conductors to a source of alternating current to apply an alternating voltage across the insulator;

solid state voltage transducing means connectable across the first and second conductors for sensing the voltage applied across the insulator and for generating a first generally sinusoidal signal indicative of the voltage across the insulator;

means for nulling parasitic currents through said solid state voltage transducing means;

current transducing means connected in series with said coupling means for sensing the current flow induced between the first and second conductors through the insulator by the applied alternating voltage and for generating a second generally sinusoidal signal indicative of the induced current flow;

means for converting the first and second signals to first and second generally repetitive waveforms having the same respective frequency and, at least in absolute value, the same relative phase relationship; and solid state means for measuring the phase angle between said first and second signals.

21. The apparatus for measuring as set forth in claim 20 wherein the repetitive waveforms are rectangular and wherein the means for converting comprises first and second zero crossing detectors each providing an output signal when the corresponding input signals pass through zero, and first and second flip-flop circuits each responsive to a corresponding zero crossing detector output to change output state.

22. The apparatus for measuring as set forth in claim 20 wherein the first conductor comprises an elongated wire and the insulator comprises a similarly elongated surface coating of insulating material, the second conductor comprising a conductive liquid through which the insulated wire may be passed.

23. The apparatus for measuring as set forth in claim 20 further comprising means for nulling parasitic capacitance and resistance of said coupling means.

24. The apparatus for measuring as set forth in claim 23 wherein the first conductor is grounded and said coupling means comprises a transformer having a primary winding adapted to be coupled to said alternating current source, said means for nulling parasitic capacitance and resistance of said coupling means comprising a primary winding shield disposed about said primary winding and connected to one end of said primary winding and to ground and wherein a feedback winding is disposed within the primary winding shield adjacent the primary winding.

25. The apparatus for measuring as set forth in claim 20 wherein the voltage transducing means comprises an operational amplifier having an inverting input terminal, a noninverting input terminal, and an output terminal; and wherein said inverting input terminal is adapted for connection to one of the conductors through a resistor and said noninverting input terminal is adapted to be connected to the other of the conductors.

26. The apparatus for measuring as set forth in claim 20 wherein said current transducing means comprises an operational amplifier having a noninverting input terminal, an inverting input terminal, and an output terminal; and wherein one of the said input terminals is connected to said coupling means and the other of said input terminals is connectable to the first conductor.

27. The apparatus for measuring as set forth in claim 26 wherein said coupling means comprises a transformer having a secondary winding disposed within a secondary winding shield with one winding end connected to said secondary winding shield, and wherein said operational amplifier inverting input terminal of said current transducing means is connected to said secondary winding shield.

28. Apparatus for determining the quality of an insulative coating on a conductor comprising:

fluid conductive means for contacting the insulative coating along a surface opposite the conductor;

means for coupling the conductor and conductive means to a source of alternating current to apply an alternating voltage across the insulative coating;

solid state means connectable across the conductor and conductive means for sensing the voltage applied across the insulative coating and for generating a first signal indicative of the voltage across the insulative coating;

means for nulling parasitic currents through said solid state means connectable across the conductor;

solid state means connected in series with the coupling means for sensing current flow and for generating a second signal indicative of the current flow induced by the alternating voltage;

means for converting the first and second signals to first and second generally repetitive waveforms having the same respective frequency and, at least in absolute value, the same relative phase relationship; and means responsive to the first and second signals for determining the phase relationship between the applied voltage and resulting current.

29. The apparatus of claim 28 further comprising means for nulling parasitic capacitance and resistance of said coupling means.

30. The apparatus of claim 28 further including logic means comprising a zero crossing detecting coincidence circuit having a first output condition when the first and second rectangular waveforms are similar to one another, and a second output condition when the first and second rectangular waveforms are dissimilar.

31. The means for measuring as set forth in claim 20 wherein the means for converting comprises first and second zero crossing comparators each providing an output signal indicative of the polarity of the signal applied thereto; and logic means for providing an output signal indicative of polarity relationship of the repetitive waveforms.

* * * * *